United States Patent [19]

Supp et al.

[11] Patent Number: 4,692,244

[45] Date of Patent: Sep. 8, 1987

[54] DISPERSER FOR A FLOTATION SYSTEM

[75] Inventors: Armin Supp, Hamm; Rainer Nebe, Mühlheim, both of Fed. Rep. of Germany

[73] Assignee: Krupp Polysius AG, Beckum, Fed. Rep. of Germany

[21] Appl. No.: 671,599

[22] Filed: Nov. 15, 1984

[30] Foreign Application Priority Data

Jan. 10, 1984 [DE] Fed. Rep. of Germany ....... 3400593

[51] Int. Cl.[4] ............................ C02F 1/24; B01F 3/04

[52] U.S. Cl. ................................ 210/219; 210/221.1; 261/93; 261/123

[58] Field of Search .................. 261/123, 93; 210/219, 210/221.1

[56] References Cited

U.S. PATENT DOCUMENTS

| | | | |
|---|---|---|---|
| 3,305,096 | 2/1967 | Schleiss | 210/221.1 X |
| 3,647,069 | 3/1972 | Bailey | 210/221.1 X |
| 3,993,563 | 11/1976 | Degner | 210/221.1 |
| 4,425,232 | 1/1984 | Lawrence et al. | 210/219 |

*Primary Examiner*—Tom Wyse
*Attorney, Agent, or Firm*—Learman & McCulloch

[57] ABSTRACT

The invention relates to a disperser for a flotation system, in which the stabilizer plates are provided with holes and are offset by a specific angle against the direction of rotation of the agitator relative to a substantially radial position with respect to the agitator. By this arrangement of the stabilizer plates a significant improvement in the selectivity is achieved, particularly in the case of materials which are difficult to prepare.

9 Claims, 4 Drawing Figures

FIG. 1
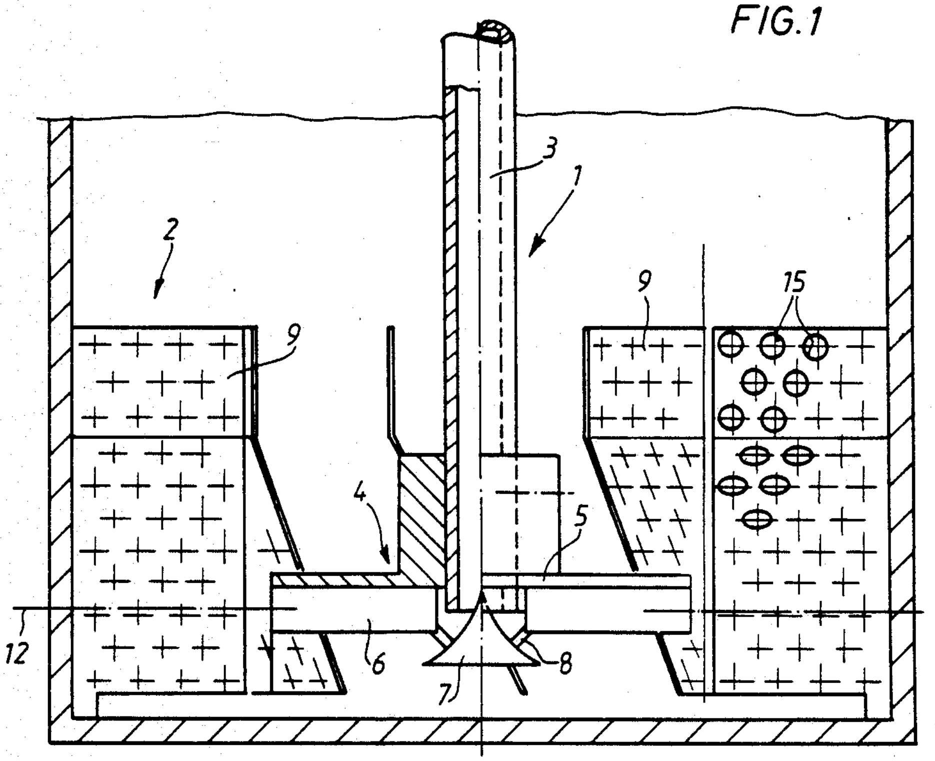
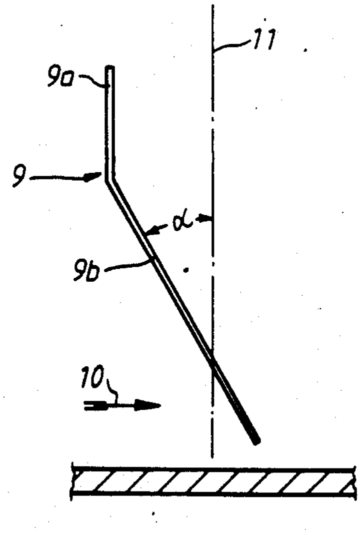
FIG. 3

FIG. 4

| | Prior art disperser arrangement System a | | | | Disperser arrangement according to the invention System b | | |
|---|---|---|---|---|---|---|---|
| | Ash in the concentrate % | Ash in the mine waste % | Selectivity index % | | Ash in the concentrate % | Ash in the mine waste % | Selectivity index % |
| Test 1<br>300 g/t Ekof 452<br>4.0 m/s<br>15 $cm^3/cm^2$min | 8.11 | 70.3 | 8.67 | Test 2 | 7.38 | 68.7 | 9.31 |
| Test 3<br>200 g/t Ekof 452<br>4.0 m/s<br>15 $cm^3/cm^2$ min | 7.40 | 70.8 | 9.57 | Test 4 | 6.80 | 70.6 | 10.38 |
| Test 5<br>100 g/t Ekof 452<br>4.0 m/s<br>15 $cm^3/cm^2$ min | 8.31 | 10.1 | 8.44 | Test 6 | 8.13 | 69.8 | 8.59 |
| Test 7<br>300 g/t Ekof 452<br>4.5 m/s<br>10 $cm^3/cm^2$ min | 7.75 | 67.2 | 8.67 | Test 8 | 7.57 | 68.6 | 9.05 |
| Test 9<br>200 g/t Ekof 452<br>4.5 m/s<br>10 $cm^3/cm^2$ min | 7.43 | 67.8 | 9.13 | Test 10 | 7.60 | 69.6 | 9.16 |
| Test 11<br>100 g/t Ekof 452<br>4.5 m/s<br>10 $cm^3/cm^2$ min | 8.13 | 68.7 | 8.45 | Test 12 | 7.19 | 69.6 | 9.68 |
| | | | Ø 8.82 | | | | Ø 9.36 |

DISPERSER FOR A FLOTATION SYSTEM

The invention relates to a flotation disperser having a plurality of stabilizer plates encircling an agitator.

BACKGROUND OF THE INVENTION

A disperser of the general type to which the invention relates is disclosed in German Patent Specification No. 28 39 758. The stabilizer plates of this known disperser are provided with holes and are arranged radially around the agitator. During the rotational movement of the agitator air is forced through the hollow agitator shaft into the slurry. The slurry which is dispersed with the air then passes through the holes in the stabilizer plates so that the air bubbles and the air-enriched hydrophobic substances which are suspended in the slurry rise upwards.

The object of the invention is to improve the known disperser in such a way that a significant improvement in the selectivity is achieved even with materials which are difficult to prepare. This object is achieved by orienting the stabilizer plates in a particular manner with respect to the direction of rotation of the agitator.

SUMMARY OF THE INVENTION

The stabilizer plates of a disperser according to the invention are offset by a specific angle against the direction of rotation of the agitator relative to a substantially radial position with respect to the agitator so that air bubbles which are spun off by the agitator, and the slurry which also is spun off, are forced to pass the disperser surface (i.e., the total surface of the stabilizer plates) almost completely, substantially at right angles to the surface directional of the stabilizer plates (the surface directional is the intersection of the stabilizer plates with a horizontal plane, the agitator being assumed to have a vertical axis). By this arrangement of the stabilizer plates so that they are offset with respect to the radial position, the greatest possible horizontal cross-section of the holes provided in the stabilizer plates is used. Dispersion is then achieved by shear forces which occur at the edges of the holes and are caused above all by the high speed on passing the holes.

THE DRAWINGS

Advantageous embodiments of the invention are explained in greater detail in the following description and are illustrated in the accompanying drawings, wherein:

FIG. 1 is a schematic representation of a flotation system according to German Patent Specification No. 28 39 758 but having stabilizer plates constructed and arranged in accordance with the invention;

FIG. 3 is a section through a stabilizer plate along the line III—III in FIG. 2; and FIG. 4 is a table containing comparative test data.

DETAILED DESCRIPTION

Figure 2:
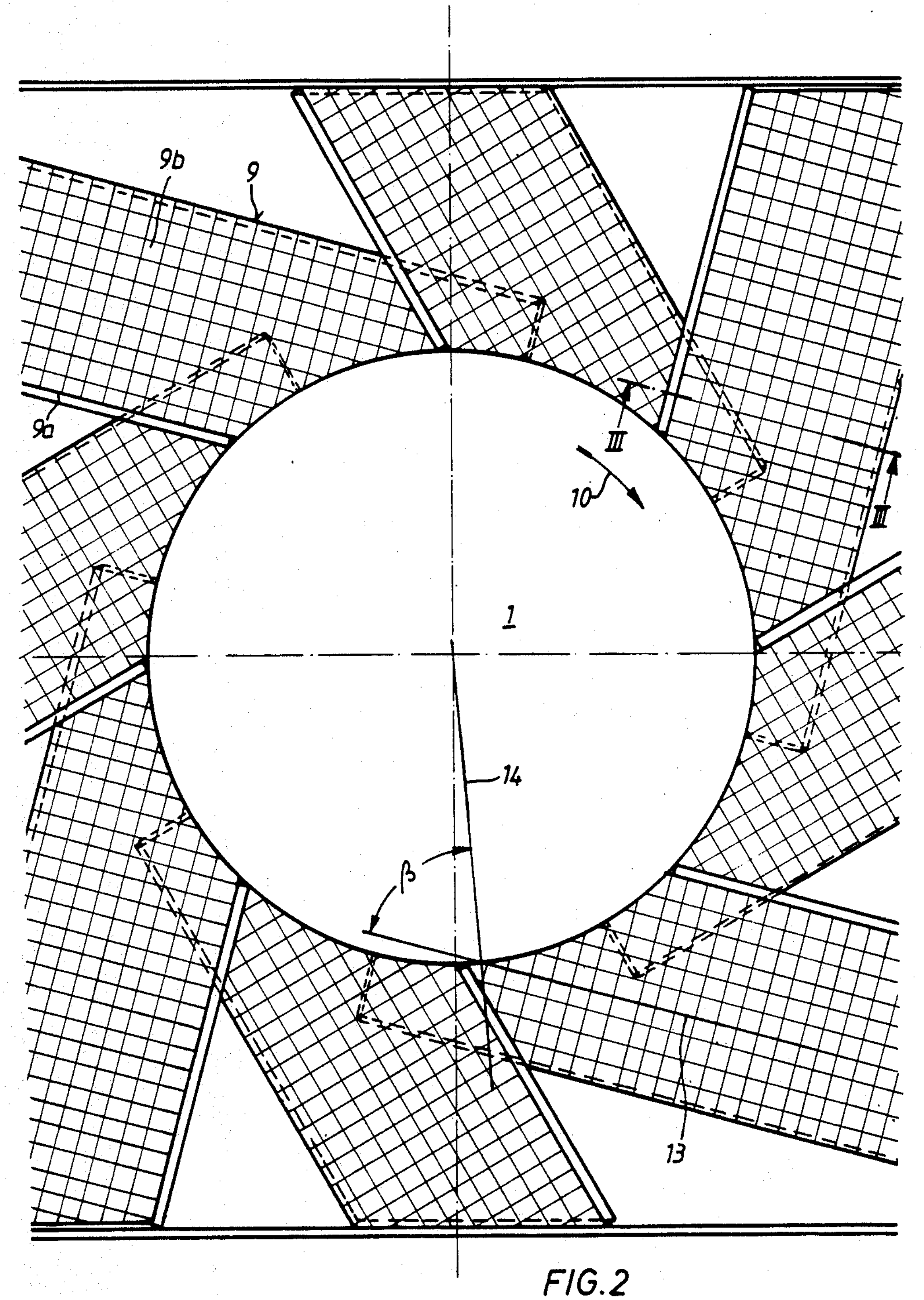
FIG. 2 is a plan view of the disperser according to the invention.

The flotation system illustrated in FIG. 1 contains an agitator 1 and a stationary disperser 2. The agitator 1 has a hollow drive shaft 3 which has a rotor 4 on its lower end. This rotor 4 consists of a disc 5 and impact strips 6 arranged on the underside of the disc. An air deflection cone 7 which is fixed to the impact strips 6 by means of struts 8 is mounted on the lower end of the hollow drive shaft 3.

The disperser 2 is only schematically indicated in FIG. 1. The details of the disperser 2 which are essential for understanding the invention are explained in greater detail in connection with FIGS. 2 and 3.

As can be seen from FIG. 2, the disperser 2 consists of a plurality of stabilizer plates 9 which are all of the same construction and are arranged stationary around the periphery of the agitator 1 (the agitator 1 is not shown in detail in FIG. 2; its direction of rotation is characterized by the arrow 10).

Each stabilizer plate 9 consists of an upper region 9*a* which is arranged vertically and a lower region 9*b* which is inclined relative to the vertical plane 11. The inclination of this lower region 9*b* relative to the vertical is designated by $\alpha$ in FIG. 3. The angle $\alpha$ can be between 30° and 60°.

According to the invention the stabilizer plates 9 are offset by a specific angle against the direction of rotation (arrow 10) of the agitator relative to a substantially radial position with respect to the agitator.

In order to state the degree of offsetting more precisely, reference is made to an imaginary horizontal plane 12 which (see FIG. 1) lies about halfway up the part of the agitator adjoining the stabilizer plates 9, i.e., approximately halfway up the impact strips 6. If this imaginary horizontal plane 12 is brought into intersection with the stabilizer plates 9, then the lines of intersection form so-called surface directionals 13, one of which is shown in FIG. 2. According to the invention the angle $\beta$ which this surface directional 13 forms with the radial 14 advantageously lies in a range of between 5° and 90°, preferably between about 30° and 60°.

As can be seen in FIGS. 2 and 3 the lower region 9*b* of the stabilizer plates 9 is inclined against the direction of rotation (arrow 10) of the rotor 4. The individual stabilizer plates 9 partially overlap in the region of the agitator 1 near the periphery. Adjacent stabilizer plates 9 are preferably connected to one another by spot welding.

The stabilizer plates 9 are provided with holes 15 (indicated schematically in FIG. 1) which can have a round, square, or rectangular cross-section and are advantageously between 5 and 16 mm in width. The clear cross sectional area of the stabilizer plates 9 formed by the holes 15 advantageously amounts to more than 50% of the total surface area of the stabilizer plates.

The stabilizer plates 9 are advantageously spaced a distance of between 5 and 100 mm (depending upon the cell size) away from the periphery of the agitator 1) in the region of the rotor 4).

In operation it is surprising that marked calming of the slurry occurs very quickly above the disperser 2. This is explained by the arrangement of the stabilizer plates according to the invention (offset against the direction of rotation of the rotor relative to the radial position) and by the simultaneous inclination of the lower region 9*b* of the stabilizer plates 9 relative to the vertical which cause zones to occur around the agitator in which the slurry is forced as it rises to flow one or more times (depending upon the peripheral speed of the agitator) through the holes of the stabilizer plates of the disperser. This ensures that only the hydrophobic particles and particles adhering to air bubbles enter the foam, so that a considerable increase in selectivity is achieved.

Comparative tests between the disperser according to the invention and according to German Patent Specification No. 28 39 758 for three different raw materials are described below:

EXAMPLE 1

(Flotation of Bolivian mined tinstone slurry <16 μm)

In the first comparative test a flotation of Bolivian mined tinstone slurry with a grain size of <16 μm was carried out. In the past this material was completely discarded because of its excessively difficult preparation and the high losses of valuable material. Without any special optimisation and with otherwise the same conditions the following results were achieved using the disperser according to the invention (Test 3) by comparison with two tests (Tests 1 and 2) using the conventional disperser according to German Patent Specification No. 28 39 758:

| | Test 1 (disperser arranged radially) | Test 2 (disperser arranged radially) | Test 3 (disperser arranged approximately tangentially according to the invention) |
|---|---|---|---|
| % Sn content of the concentrate | 2.22 | 2.16 | 2.11 |
| % Sn content of the residue | 0.34 | 0.35 | 0.30 |
| % Sn yield from a 0.54% Sn—containing charge | 43.71 | 41.70 | 51.86 |

The tests were carried out in a 2.8 liter Krupp disc agitator flotation compartment in one stage at 100 r.p.m. (corresponding to a peripheral speed of the agitator of 4.7 m/s) and independent ventilation of 20 $cm^3$ air/$cm^2$ compartment surface and min with 1500 g/t Aerosol 22 as collector over equal flotation times.

The improvement in the yield is unequivocal on the basis of the results of the comparative tests. The selectivity index, i.e., the ratio of the Sn content of the concentrate to that of the residue, in the comparative tests amounts to 6.53 (Test 1) and 6.17 (Test 2) and, in the case of Test 3 with the disperser arrangement according to the invention, 7.03. Accordingly by comparison with the conventional best test the selectivity index was improved by 7.66%.

EXAMPLE 2

(Flotation of poor Meggen ore on lead)

In this example sulphidic poor Meggen ore, which is very difficult to float, particularly as regards to Pb, was chosen with a Pb content of approximately 0.7%.

2×2 parallel flotation tests were carried out on Pb in order to compare the effectiveness with regard to the selectivity to be achieved. Tests 1 and 3 were carried out using the conventional radially arranged stabilizer plates, whereas Tests 2 and 4 were performed using stabilizer plates arranged approximately tangentially according to the invention.

The flotation conditions corresponded to those which are customary in the art.

The selectivity indices of these four tests amounted to:

| | |
|---|---|
| Test 1 (radially arranged disperser)<br>Test 3 (radially arranged disperser) | 3.54 |
| Test 2 (tangentially arranged disperser)<br>Test 4 (tangentially arranged disperser) | 3.83 |

Thus with almost equal Pb yields the improvement in the selectivity amounts on average to 8.19%.

EXAMPLE 3

(Flotation of washing water from hard coal treatment)

Up to 60% of the washing water consisted of particles <10 μm. The coarsest grains had a size of 63 μm. The ash content of the fraction <10 μm amounted on average to 65%, and the ash content of the total flotation charge amounted on average to 40%. At the time of the tests the content of solid material in the flotation charge amounted to approximately 40 g/l. The reagent consumption amounted to 100, 200 and 300 g/t Ekof 452.

The results of this study are set out in the table of FIG. 4. It will be noted that, as a result of the arrangement of the stabilizer plates of the disperser according to the invention, an improvement in the selectivity index of 6.12% on average is achieved by comparison with the previous arrangement.

We claim:

1. In a flotation disperser having a rotatable agitator rotor and a plurality of stabilizer plates provided with holes encircling the rotor, each of said stabilizer plates having an upper vertical portion and a lower portion inclined at an angle of between 30°–60° relative to the vertical, the improvement wherein the stabilizer plates are angularly offset against the direction of rotation of the rotor relative to a substantially radial position with respect to the rotor.

2. A disperser according to claim 1 wherein each stabilizer plate has a surface directional formed by the intersection of the stabilizer plate with a horizontal plane at an angle which is between about 5° and 90°.

3. A disperser according to claim 2 wherein said angle is between about 30° and 60°.

4. A disperser according to claim 1, wherein the lower portion of each stabilizer plate is inclined against the direction of rotation of the rotor.

5. A disperser according to claim 1 wherein the stabilizer plates partially overlap one another in the region of the rotor.

6. A disperser according to claim 5 wherein adjacent stabilizer plates are connected to one another.

7. A disperser according to claim 1 wherein the combined cross-sectional area of the holes in each stabilizer plate amounts to more than 50% of the total surface area of such stabilizer plate.

8. A disperser according to claim 1 wherein the holes in each of said stabilizer plates has a configuration selectively round, square, or rectangular, and a width of between about 5 and 16 mm.

9. A disperser according to claim 1 wherein the distance of the stabilizer plates from the periphery of the rotor is between about 5 and 100 mm.

* * * * *

UNITED STATES PATENT AND TRADEMARK OFFICE
CERTIFICATE OF CORRECTION

PATENT NO. : 4,692,244
DATED : September 8, 1987
INVENTOR(S) : Armin Supp et al

It is certified that error appears in the above-identified patent and that said Letters Patent is hereby corrected as shown below:

Column 4, bridging lines 42 and 43, change "said angle" to -- the angle of said surface directional -- .

Signed and Sealed this

Twelfth Day of January, 1988

*Attest:*

DONALD J. QUIGG

*Attesting Officer*

*Commissioner of Patents and Trademarks*